(12) United States Patent
Rodriguez-Cruz

(10) Patent No.: US 12,168,411 B2
(45) Date of Patent: Dec. 17, 2024

(54) CAPROP

(71) Applicant: Angel Rodriguez-Cruz, The Villages, FL (US)

(72) Inventor: Angel Rodriguez-Cruz, The Villages, FL (US)

( * ) Notice: Subject to any disclaimer, the term of this patent is extended or adjusted under 35 U.S.C. 154(b) by 333 days.

(21) Appl. No.: 17/300,159

(22) Filed: Apr. 6, 2021

(65) Prior Publication Data
US 2022/0314898 A1 Oct. 6, 2022

(51) Int. Cl.
*B60R 11/06* (2006.01)
*B60R 9/05* (2006.01)
*B60R 9/055* (2006.01)
*B60T 3/00* (2006.01)
*B60R 11/00* (2006.01)

(52) U.S. Cl.
CPC ........... *B60R 11/06* (2013.01); *B60R 9/05* (2013.01); *B60R 9/055* (2013.01); *B60R 2011/004* (2013.01); *B60T 3/00* (2013.01)

(58) Field of Classification Search
CPC B60R 11/06; B60R 9/05; B60R 9/055; B60R 9/04; B60T 3/00
USPC ..... 296/37.7, 180.1; 224/274, 309, 324, 328
See application file for complete search history.

(56) References Cited

U.S. PATENT DOCUMENTS

| | | | | |
|---|---|---|---|---|
| 1,263,343 A * | 4/1918 | Beck | ..................... | A47B 49/002 312/328 |
| 2,237,214 A * | 4/1941 | Burkart | ..................... | B60T 3/00 D12/217 |
| 5,409,560 A * | 4/1995 | Hammer | ............... | B65D 81/113 53/157 |
| 5,498,049 A * | 3/1996 | Schlachter | .............. | B60R 11/06 224/543 |
| 6,325,448 B1 * | 12/2001 | Estrada | .................. | B60R 11/06 296/180.1 |
| 7,311,347 B1 * | 12/2007 | Aller | ...................... | A63B 55/61 296/84.1 |
| 2005/0194414 A1 * | 9/2005 | Lynch | ..................... | B60R 9/055 224/406 |
| 2008/0295253 A1 * | 12/2008 | Hoover | ................ | B25B 13/005 29/245 |
| 2010/0045074 A1 * | 2/2010 | Friedman | ................ | B60R 21/13 296/210 |
| 2015/0343959 A1 * | 12/2015 | Espig | ....................... | A45C 5/14 296/180.1 |

(Continued)

FOREIGN PATENT DOCUMENTS

EP 0814005 A1 * 12/1997 ............. B60R 11/06
KR 20160127974 A * 11/2016

*Primary Examiner* — Daniel J Colilla

(57) ABSTRACT

CAPROP (Tools Hood): It is a tool box located at the top rear of the cart. The intention is to equip it with the necessary tools to make it independent. The flap covering the CAPROP tool box opens and is secured with a double leg hinge, exposing different attachments, deployed in their particular spaces. The flap of the tool box closes with a twist lock with key. It has a night work led bulb inside and a red emergency light on top of the flap outside. All those tools within CAPROP are necessary to solve different emergency situation. Behind each tools pocket is a 10 foot piece of nylon rope. Inside the drawer are a pair of gloves, a first aid kit, a tire repair kit and a clean cloth. The uses of golf carts has been on the rise given their low cost maintenance and its accessibility in rural areas. It is used frequently by disabled persons.

9 Claims, 32 Drawing Sheets

(56) References Cited

U.S. PATENT DOCUMENTS

| | | | |
|---|---|---|---|
| 2019/0299943 A1* | 10/2019 | Gregory | B60T 3/00 |
| 2021/0146762 A1* | 5/2021 | Theobald | B60R 9/04 |
| 2021/0213886 A1* | 7/2021 | Koeppel | B60R 9/055 |
| 2021/0291718 A1* | 9/2021 | Thompson | B60P 3/36 |

* cited by examiner

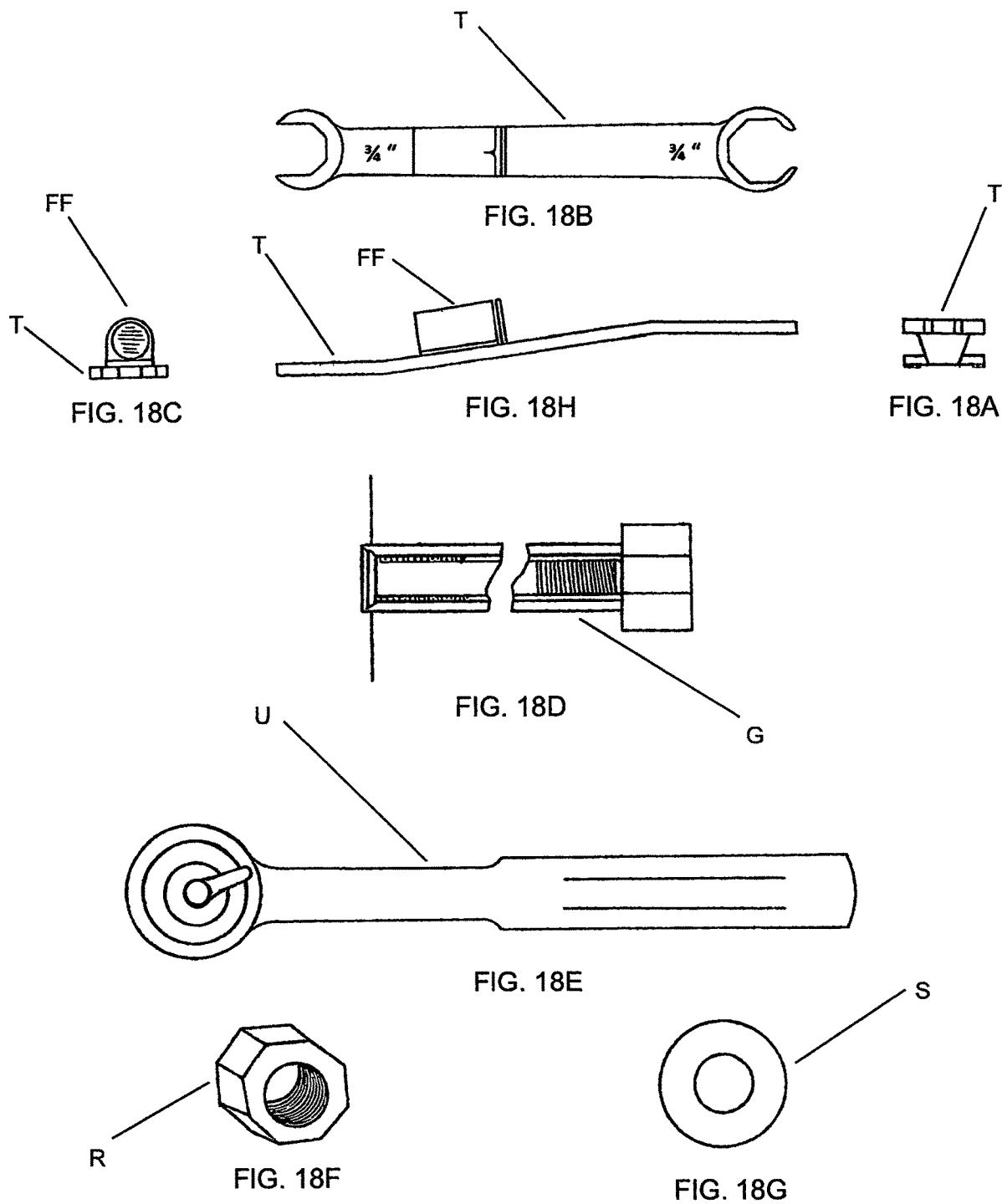

CAPROP

CROSS REFERENCE TO RELATED APPLICATIONS

This application is related to non-provisional application Ser. No. 16/974,125 filed on Oct. 14, 2020, and non-provisional application Ser. No. 15/530,922 filed on Mar. 24, 2017.

BACKGROUND OF THE INVENTION

Field of the Invention

The present application relates to a tool box for golf carts. Two chocks inside a box can create tools to perform different tasks for servicing a golf cart. Many of the tools that can be created are shown in the figures and comprise but are not limited to a jack, a pickaxe, a scraper a ¾" wrench, a hammer, and two chock for restricting movement of a golf cart tire. Other tools and parts that can be created facilitate on the run maintenance of the golf cart.

Background Art

Usually, a golf cart is accompanied by an arrangement of tools. Each different vehicle having its own set of different tools. In the case of CAPROP all tools needed to fix the golf cart are located in the roof at the top rear of the cart. So, any damage can be fixed as soon as possible, particularly with the help of a good Samaritan, because the tools are readily available.

BRIEF SUMMARY OF INVENTION

The objective of the present invention is to introduce a toolbox located at the top rear of the golf cart that provides possible solutions to mechanical failures that have occurred in golf carts. This disclosure describes the functionality of each of the tools included in CAPROP.

DETAILED DESCRIPTION OF THE INVENTION

Figure 1:
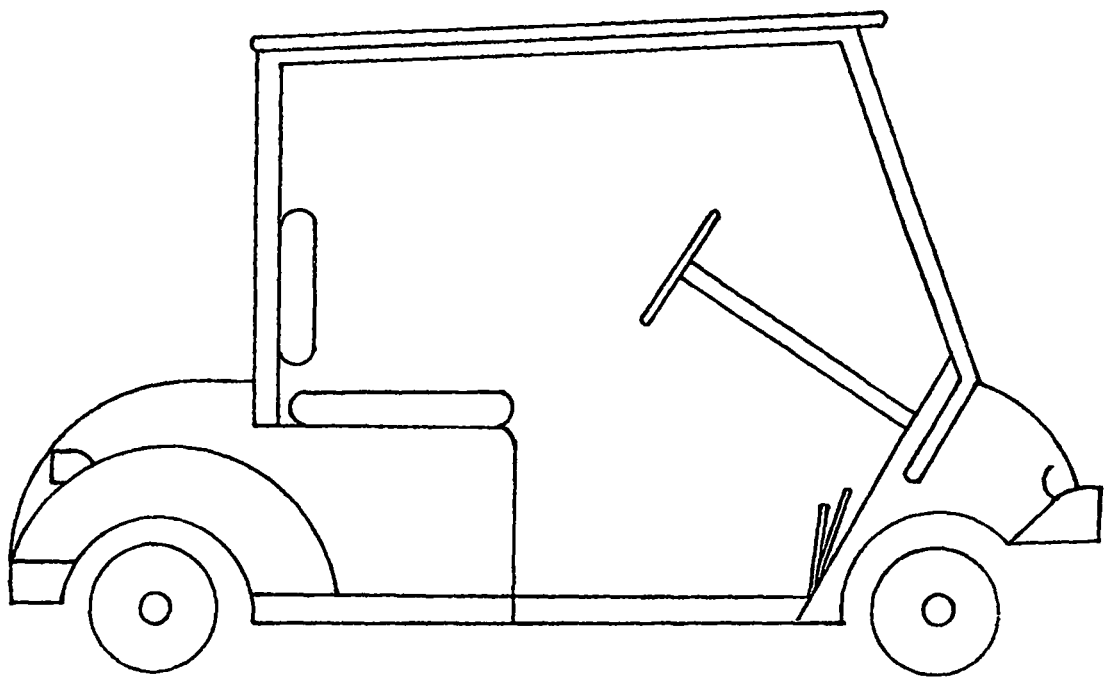
FIG. 1 Shows a side view of a conventional golf cart without aerodynamic styling.
Figure 2:
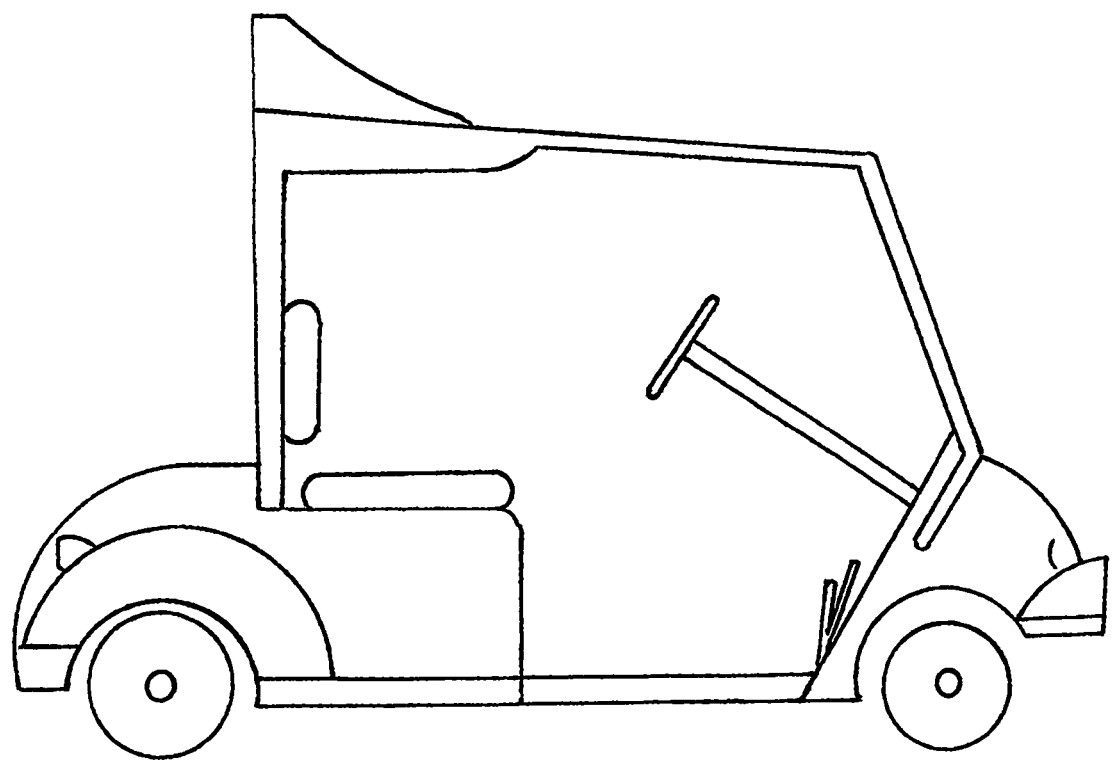
FIG. 2 Shows a side view of the inventive golf cart, CAPROP 4.
Figure 3:
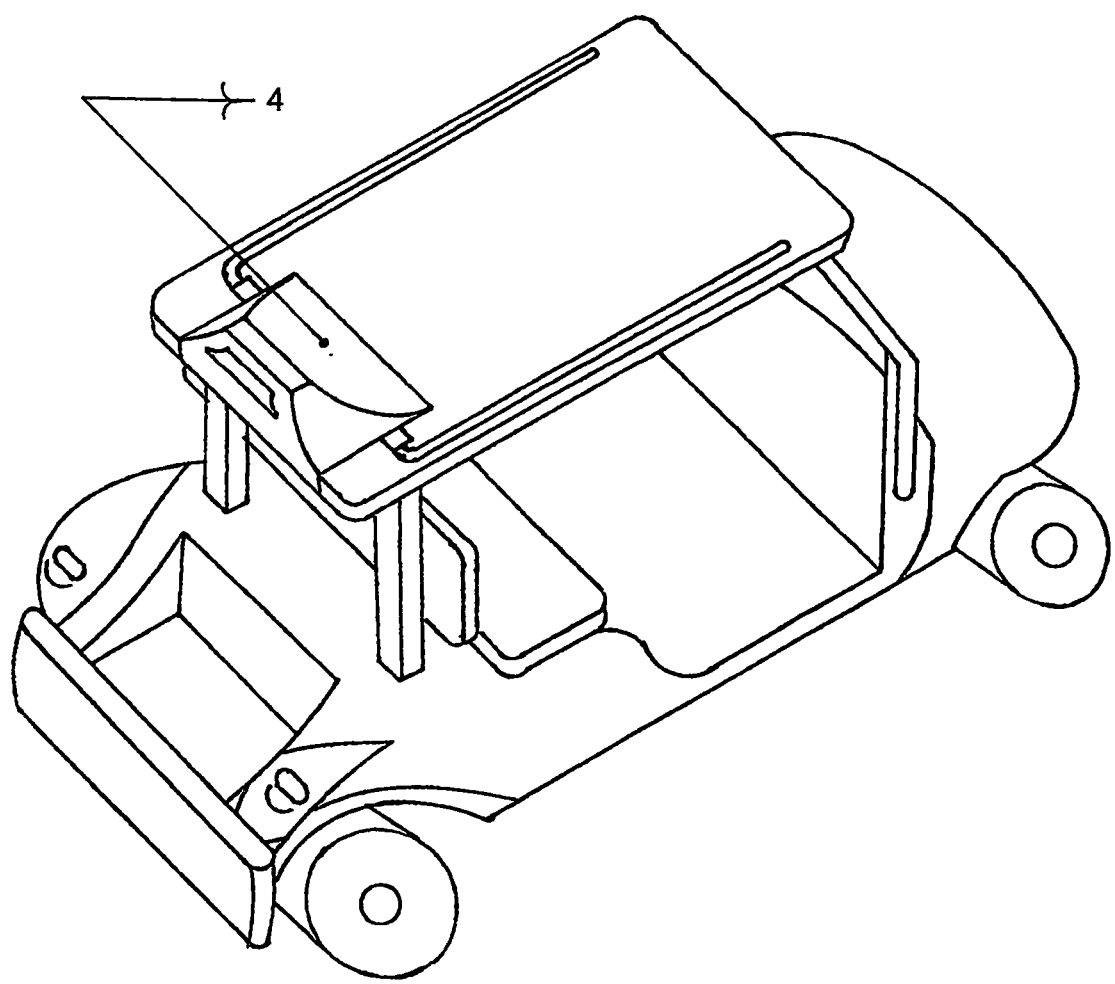
FIG. 3 shows a perspective view of the embodiment of CAPROP 4.
Figure 4C:
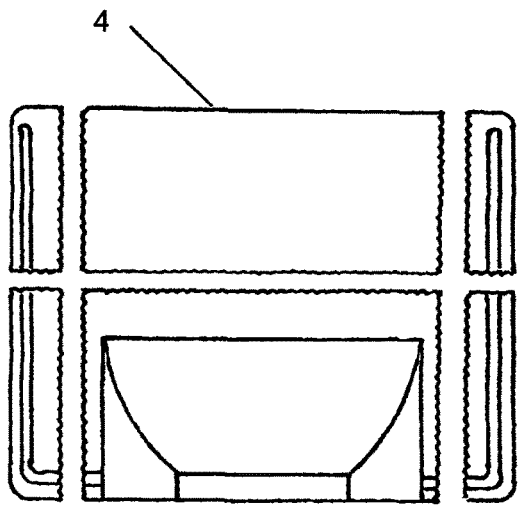
FIG. 4C shows an arial view of CAPROP 4.
Figure 4E:
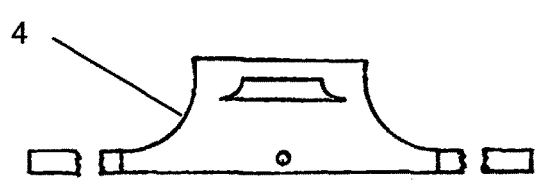
FIG. 4E shows a rear view of CAPROP 4.
Figure 4B:
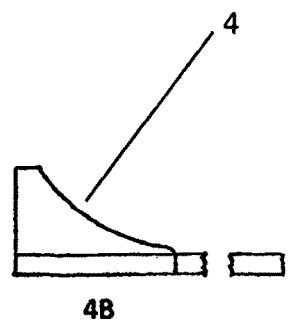
FIG. 4B shows a right side elevational view of CAPROP 4. The left side is a mirror image of the right side.
Figure 4D:
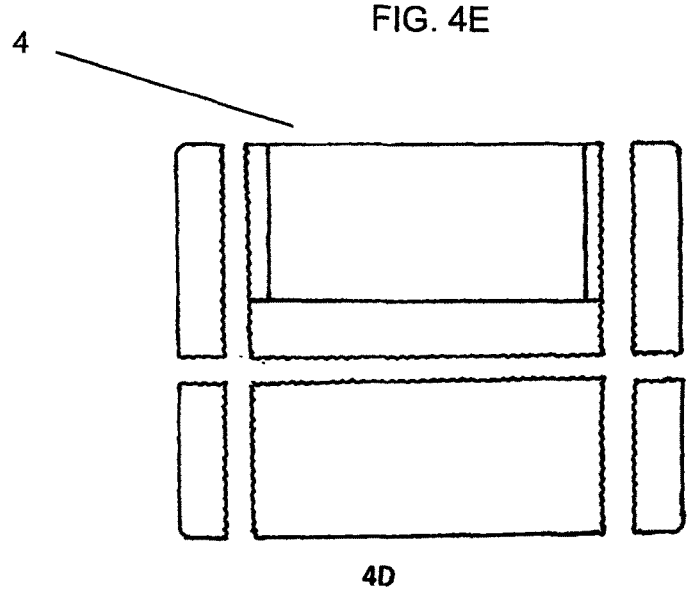
FIG. 4D shows a bottom side view of CAPROP 4.
Figure 4A:
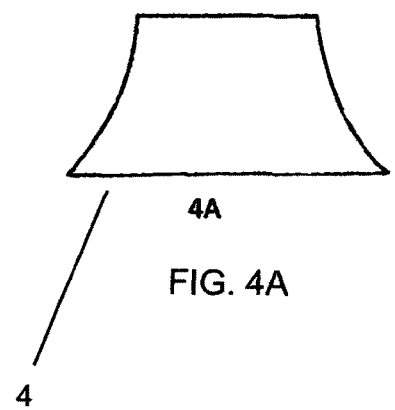
FIG. 4A shows a front view of CAPROP 4.

A typical golf cart is shown in FIG. 1. This golf cart does not have aerodynamic styling. However, FIG. 2 shows a side view of the inventive golf cart including the tool box, CAPROP. CAPROP is a shoe-shaped tool box that mounts to the rear roof of a golf cart giving the golf cart an aerodynamic style. Additionally, the protruding shape of CAPROP has the added benefit of preventing the vehicle from continuing to roll in the event of a rollover.

Figure 6:
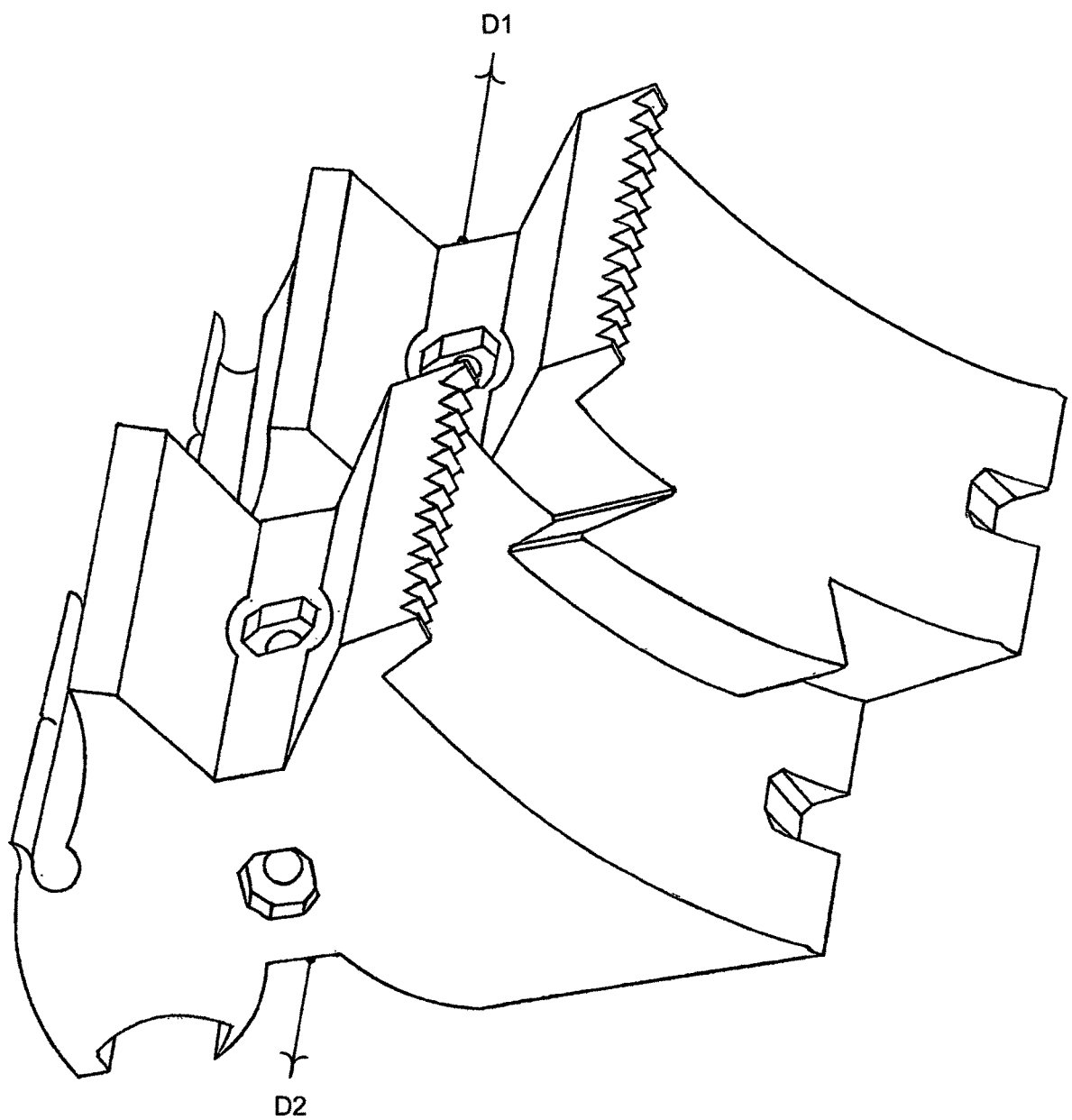
FIG. 6 shows a perspective view of the PROPCA tool including chocks D1 and D2 being assembled together.

CAPROP stores a plurality of tools including two chocks D1 and D2 (known herein has PROPCA). As shown in FIG. 6 PROPCA includes two chocks D1 and D2 that can be slid together using a protuberance in chock D1 and a groove in chock D2. Once the two chocks are coupled together and a spike G is inserted into the holes passing through each chock and the 11" screw N1 is placed in the nail removing space of each chock, PROPCA can then be stored in CAPROP.

Figure 7:
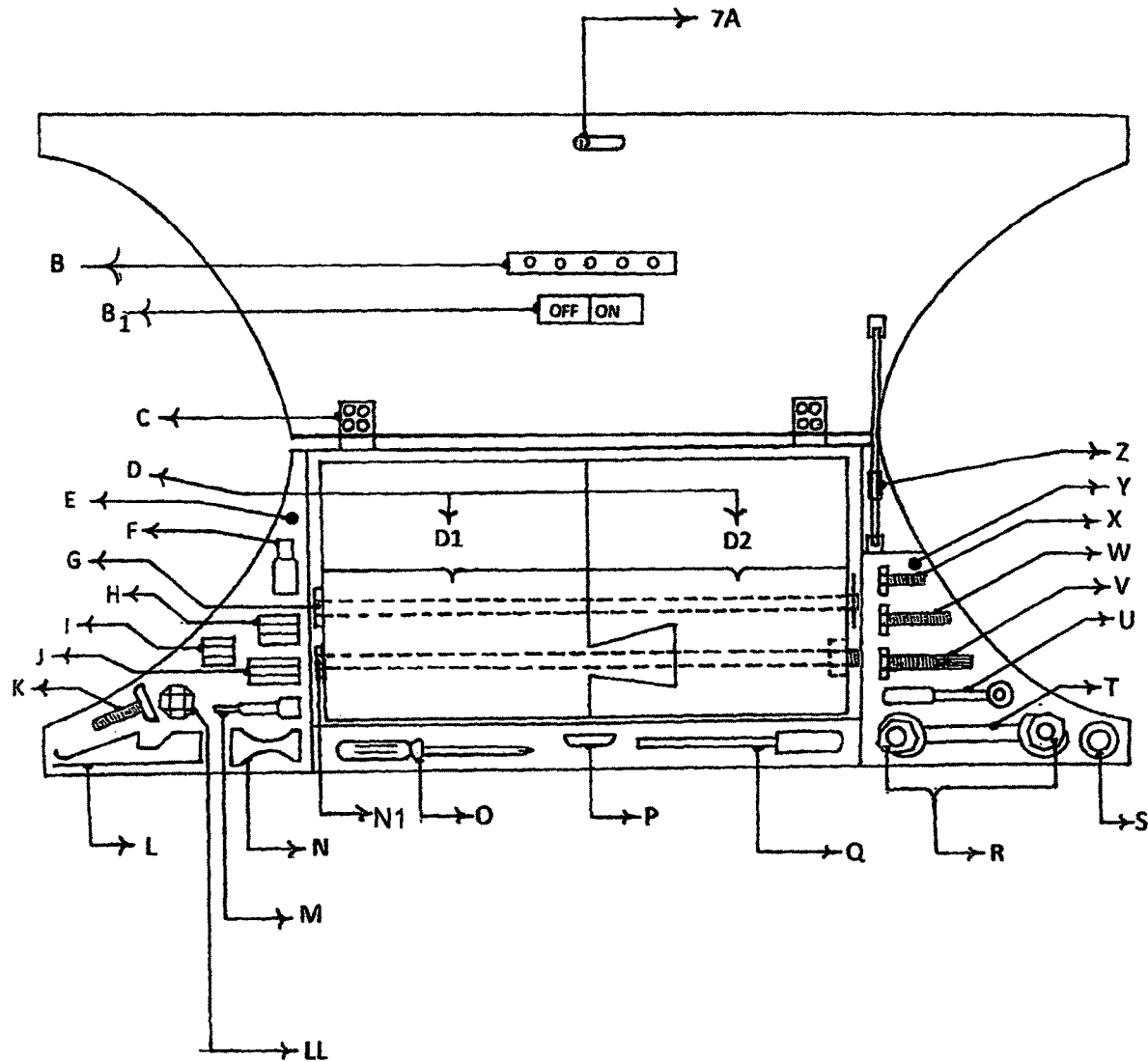
FIG. 7 shows the CAPROP in an open position exposing the chocks and other tools.
Figure 8C:
FIG. 8C shows a right side view of lock 7A.
Figure 8B:
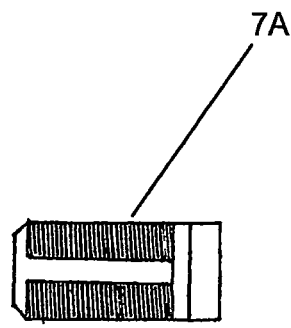
FIG. 8B shows a rear side view of lock 7A.
Figure 8D:
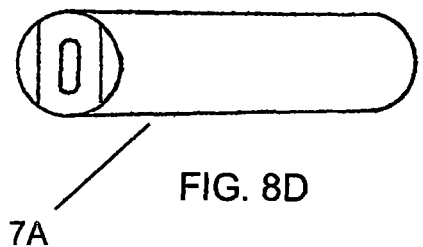
FIG. 8D shows a top side view of lock 7A.
Figure 8A:
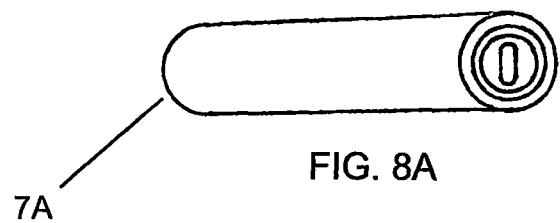
FIG. 8A shows a front elevation view of lock 7A.
Figure 9D:
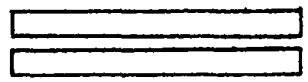
FIG. 9D shows a top view of the LED lamp B from inside and outside the toolbox.
Figure 9A:
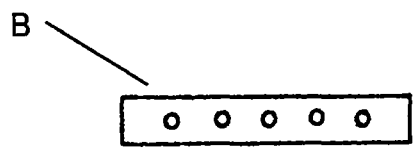
FIG. 9A depicts the front view of the LED lamp B inside of the tool box.
Figure 9C:
FIG. 9C shows the LED lamp B from inside and outside of the tool box.
Figure 9B:
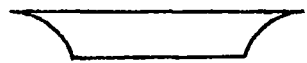
FIG. 9B shows the rear side view of LED lamp B.
Figure 9E:
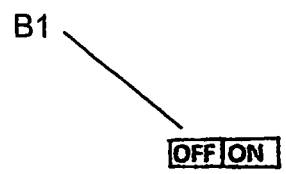
FIG. 9E shows the on/off switch B1.
Figure 10D:
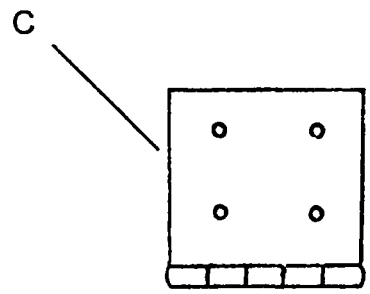
FIG. 10D shows a top side view of cabinet hinge C.
Figure 10A:
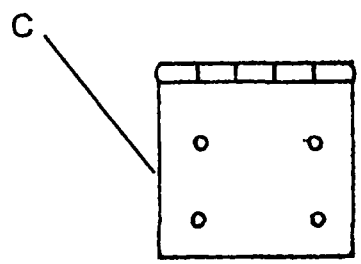
FIG. 10A shows a front view of cabinet hinge C.
Figure 10C:
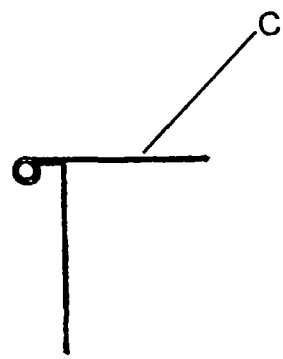
FIG. 10C shows a right side view of cabinet hinge C.
Figure 10B:
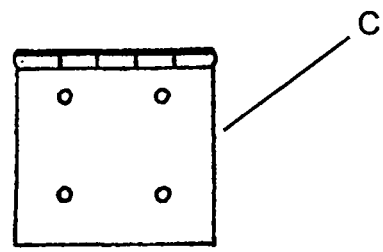
FIG. 10B shows a rear view of cabinet hinge C.
Figure 11:
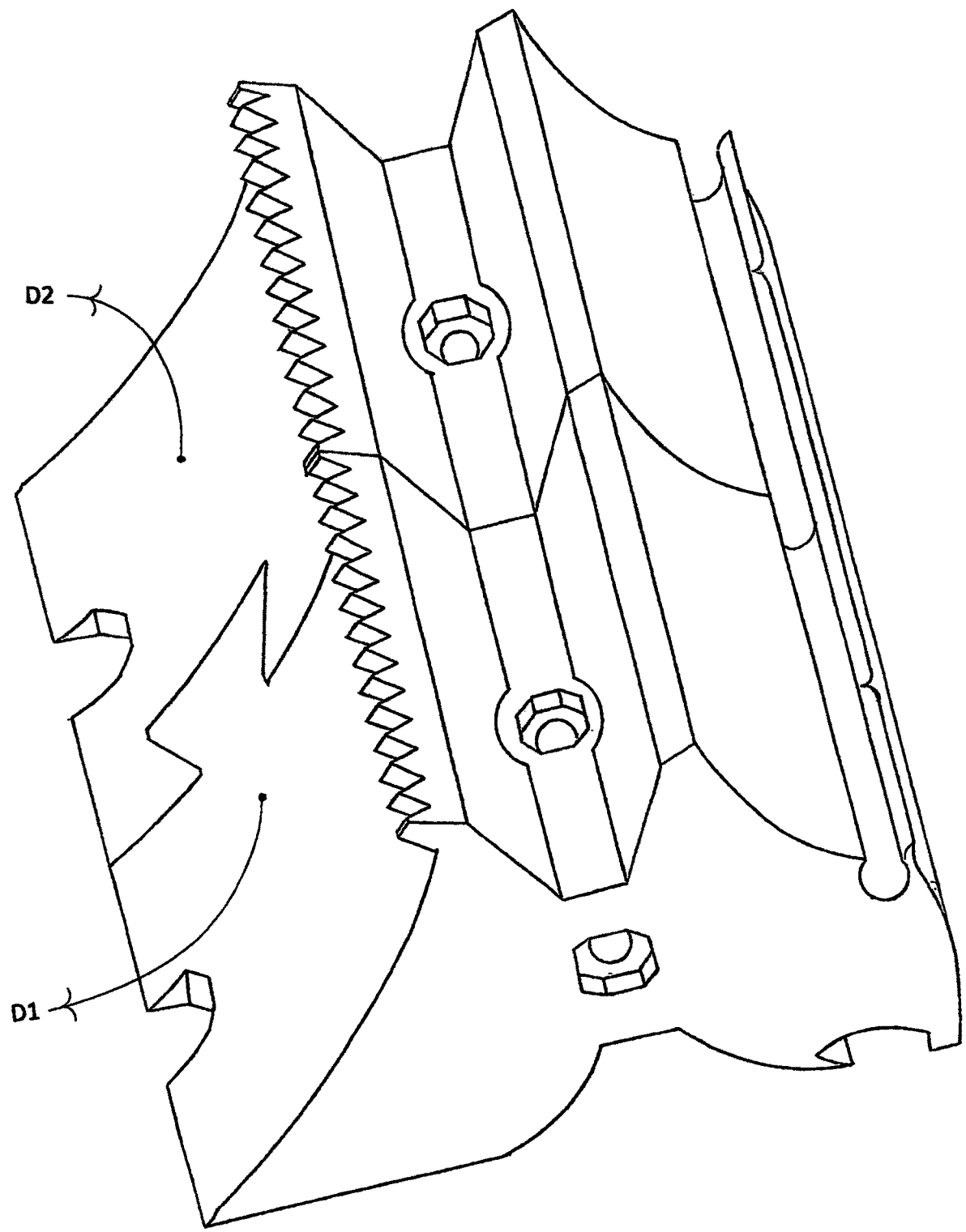
FIG. 11 shows a perspective of chocks D1 and D2 which form the PROPCA tool.

As shown in FIG. 7 CAPROP 4 is formed of a main housing including a lid hingedly attached to the main housing by hinges C and cabinet hinge Z. Underneath the storage area that holds chocks D1 and D2 is a drawer with a drawer handle P. The drawer is configured to store a first aid kit, a tire repair kit, two pairs of gloves and a cleaning cloth. The lock 7A, as shown in FIG. 8, secures the lid to the main housing.

Figure 12D:
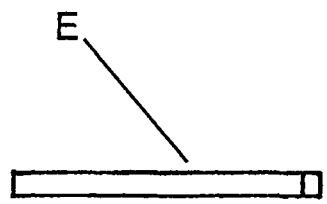
FIG. 12D shows a top edge view of the left side E of the tool compartment.
Figure 12A:
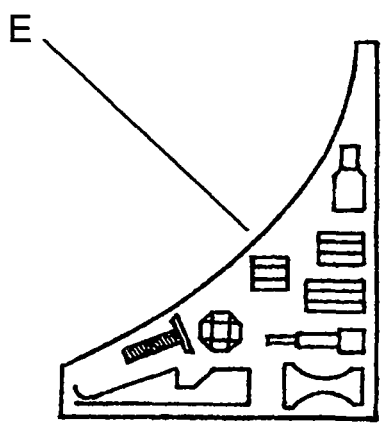
FIG. 12A shows a plan view of a left side E of the tool compartment, including tool pockets.
Figure 12C:
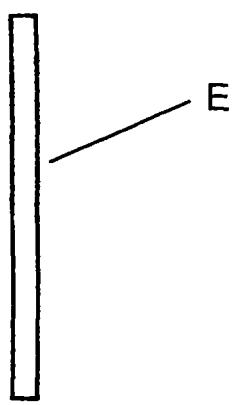
FIG. 12C shows a right side view of the left side E of the tool compartment.
Figure 12E:
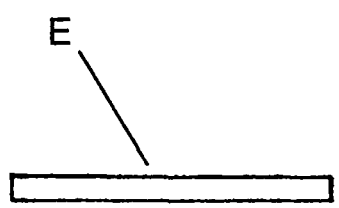
FIG. 12E shows a bottom side view of the left side E of the tool compartment.
Figure 12B:
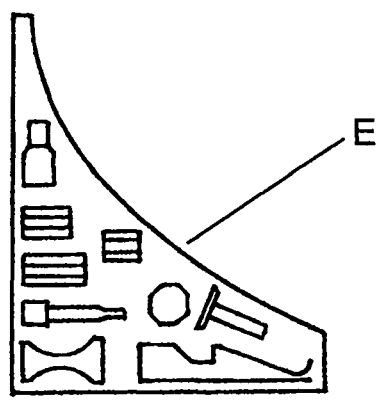
FIG. 12B shows a rear view of the left side E of the tool compartment.
Figure 13A:
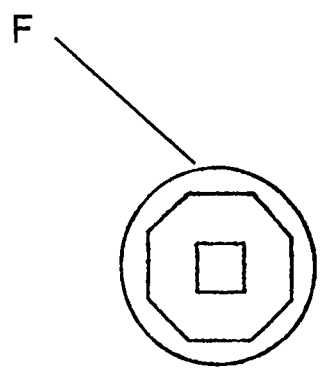
FIG. 13A shows a front view of ¾" tool cup F.
Figure 13B:
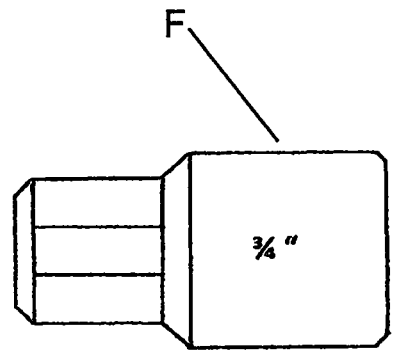
FIG. 13B shows a side view of ¾" tool cup F.

Referring to FIGS. 7 and 12A, the left side E of the CAPROP is shown with a plurality of compartments for holding various tools. Shown here, the left side holds tools including a ¾" tool cup F, a trapezoid member H, a trapezoid member I, a trapezoid member J, a screw K, a clip L, a plug extension M, a handle N, and a loose washer LL.

Figure 20D:
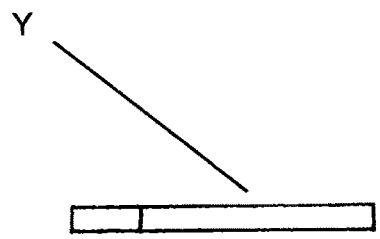
FIG. 20D depicts a top side view of the right side Y of the tool compartment.
Figure 20A:
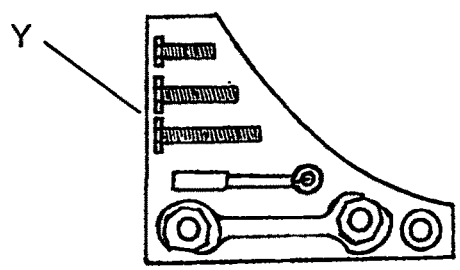
FIG. 20A shows a plan view of a right side Y of the tool compartment, including tool pockets.
Figure 20B:
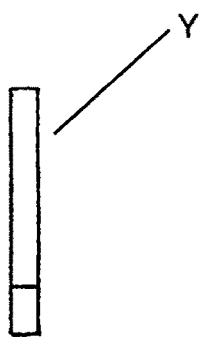
FIG. 20B depicts a right side view of the right side Y of the tool compartment.
Figure 20E:
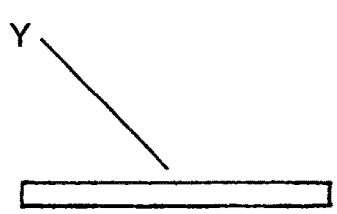
FIG. 20E depicts a bottom side view of the right side Y of the tool compartment.
Figure 20C:
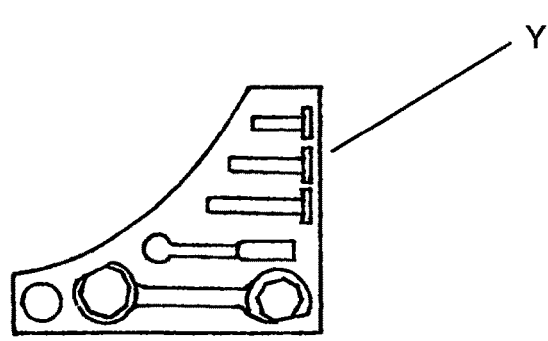
FIG. 20C depicts a rear side view of the right side Y of the tool compartment.
Figure 21D:
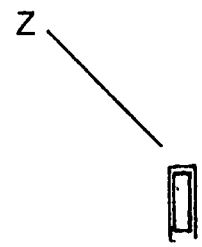
FIG. 21D shows a top view of the cabinet hinge Z.
Figure 21A:
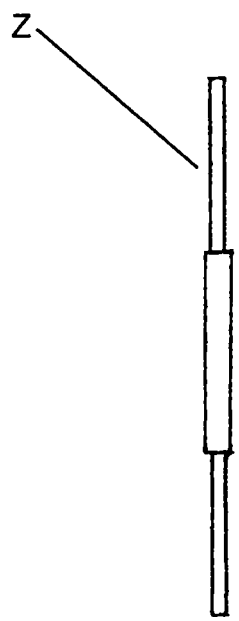
FIG. 21A shows a front view of a cabinet hinge Z.
Figure 21C:
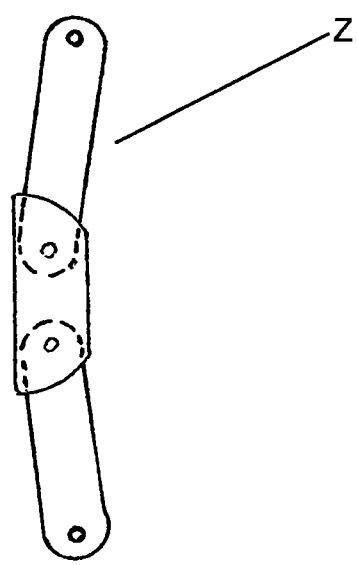
FIG. 21C shows a right side view of the cabinet hinge Z.
Figure 21B:
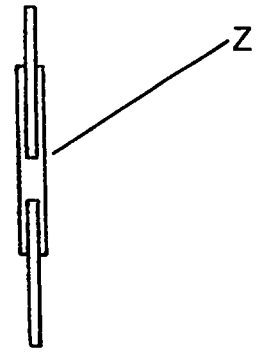
FIG. 21B shows a rear view of the cabinet hinge Z.

Referring to FIGS. 7 and 20A, the right side Y of CAPROP is shown with a plurality of compartments for holding various tools. Shown here, the right side holds tools including two nuts R, two washers S, a wrench (or spanner) T, a ratchet wrench U, an 11" bolt V, an 8" bolt W, and a 4" bolt X. Additionally, a 10' nylon rope can be stored in a space underneath the right side Y of CAPROP.

CAPROP also stores a screwdriver O and air pump Q in an area adjacent to where the chocks D1 and D2 are stored and between the left side E and the right side Y.

Figure 14D:
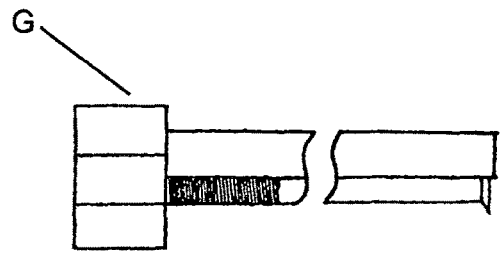
FIG. 14D depicts a top view of the spike G1 with the spike extension located inside the spike.
Figure 14C:
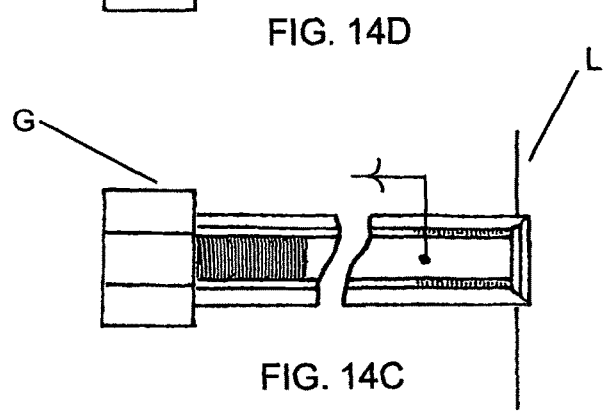
FIG. 14C depicts a side of the spike G1 with the spike extension located inside the spike.
Figure 14B:
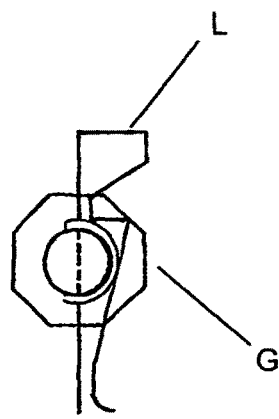
FIG. 14B shows an end view of clip L engaged in notch L2. It is used to assemble a spatula.
Figure 14A:
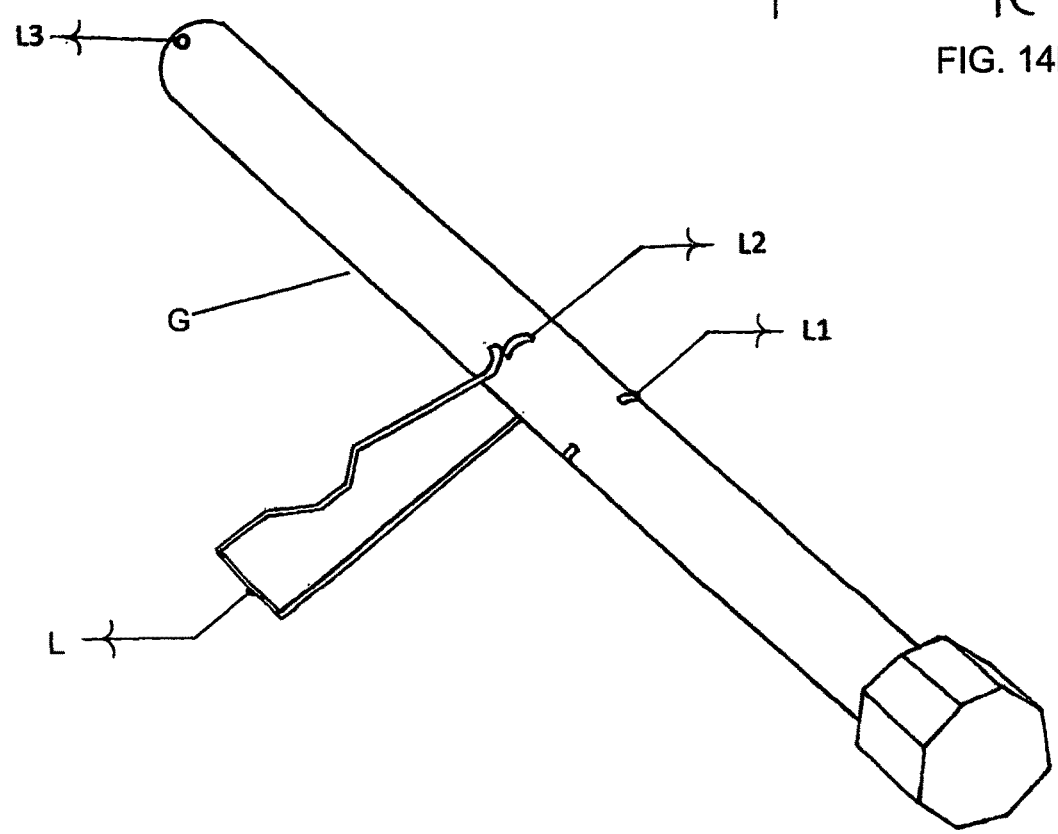
FIG. 14A shows a perspective view of dowel G.
Figure 15D:
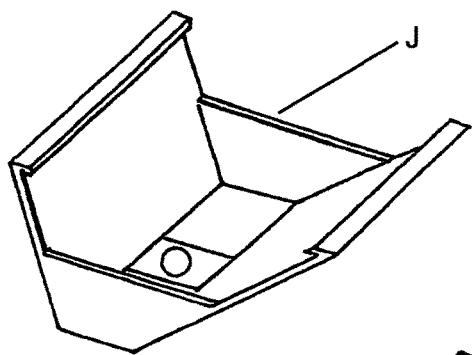
FIG. 15D shows a perspective view of a large sized trapezoid J configured to be attached to the top of the head of the screw to be used as a jack.
Figure 15E:
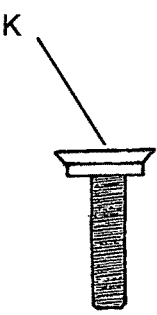
FIG. 15E shows a side elevational view of a small screw K configured to fix different attachments to the head of the jack screws.
Figure 15C:
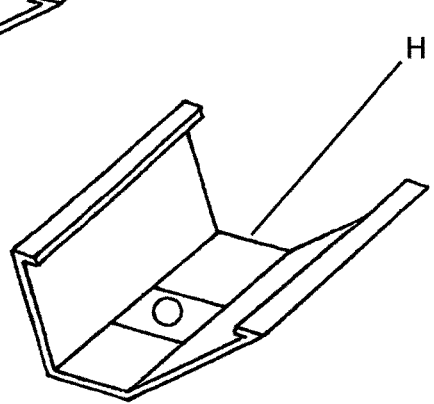
FIG. 15C shows a perspective view of a medium sized trapezoid H configured to be attached to the top of the head of the screw to be used as a jack.
Figure 15B:
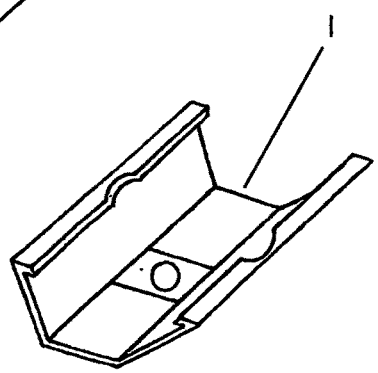
FIG. 15B shows a perspective view of a small sized trapezoid I configured to be attached to the top of the head of the screw to be used as a jack.
Figure 15F:
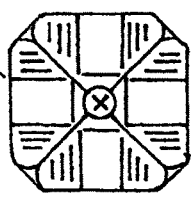
FIG. 15F shows a front view of a loose washer LL configured to be used when the space between the jack and the cart body is too small.
Figure 15G:
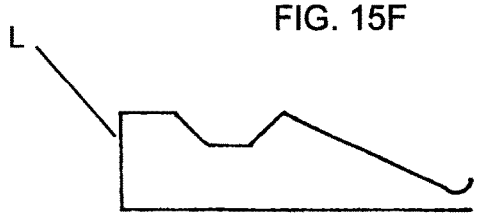
FIG. 15G shows a plan view of the clip L. It is used to fix different positions of the chock with notches in the spike.
Figure 15A:
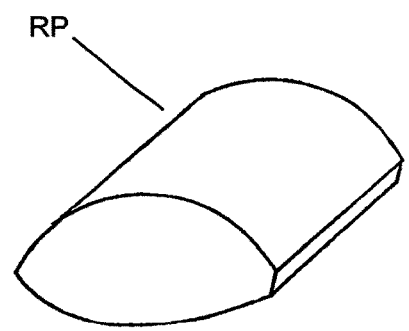
FIG. 15A shows a perspective view of a piece of rubber RP configured to be placed under a chock to prevent slipping of the chock.
Figure 15H:
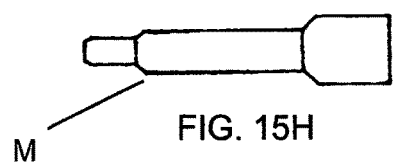
FIG. 15H shows a plan view of the plug extension M for the ratchet wrench U.

The elements stored in CAPROP can be used to form different tools useful in the servicing of the golf cart. For example, referring FIGS. 14A-14D, clip L is shown engaged in notch L2 in order to form a spatula. The bolt enters through the bottom octagonal hole of the chock. The clip L can be moved to notch L3 in order to retain the extension inside the spike G (as sown in FIG. 14C).

Figures 16A, 16B, 16C:
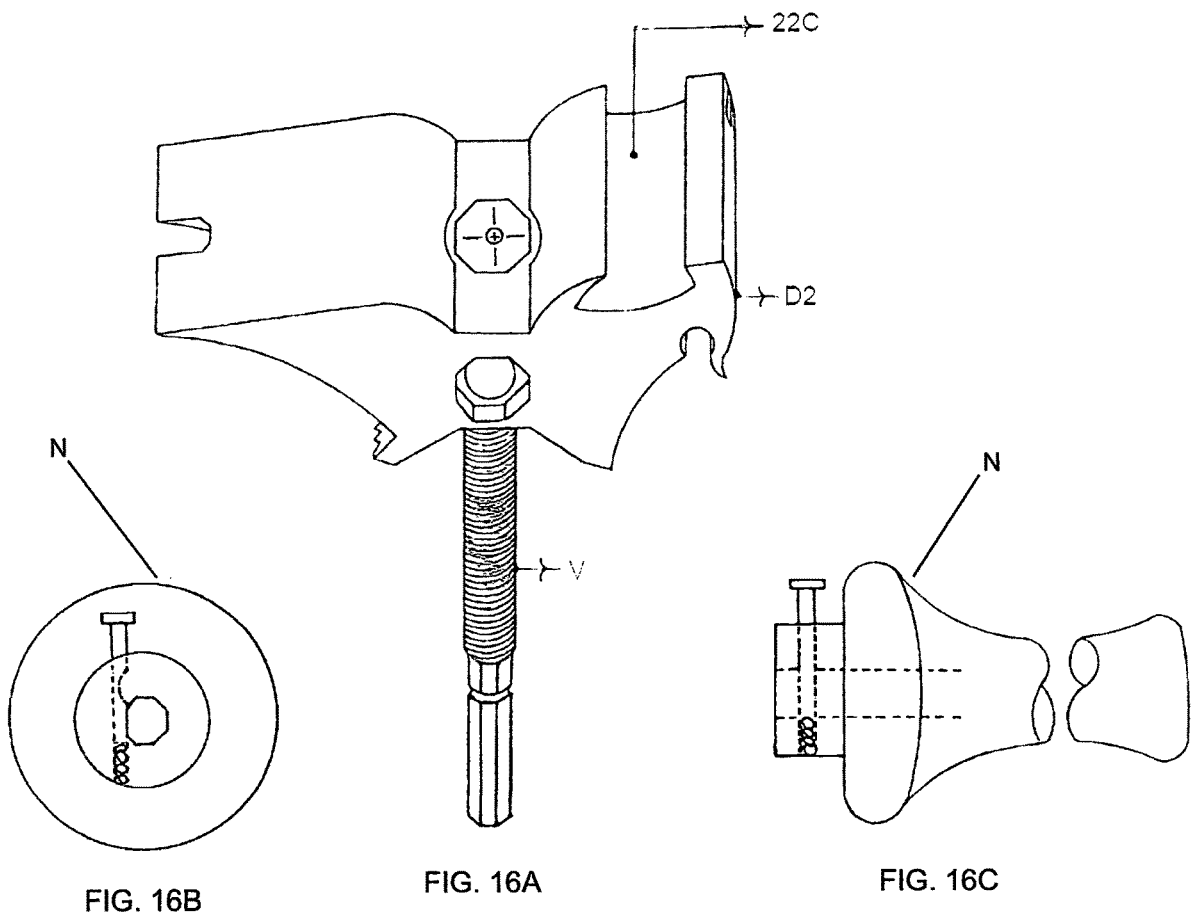
FIG. 16A Is a perspective view of a pickaxe.
FIG. 16B shows an end view of the handle N.
FIG. 16C shows a side view of the handle N. V is a bolt for the quick handle. The bolt penetrates through the octagonal hole in the bottom of the chock D2.
Figure 17C:
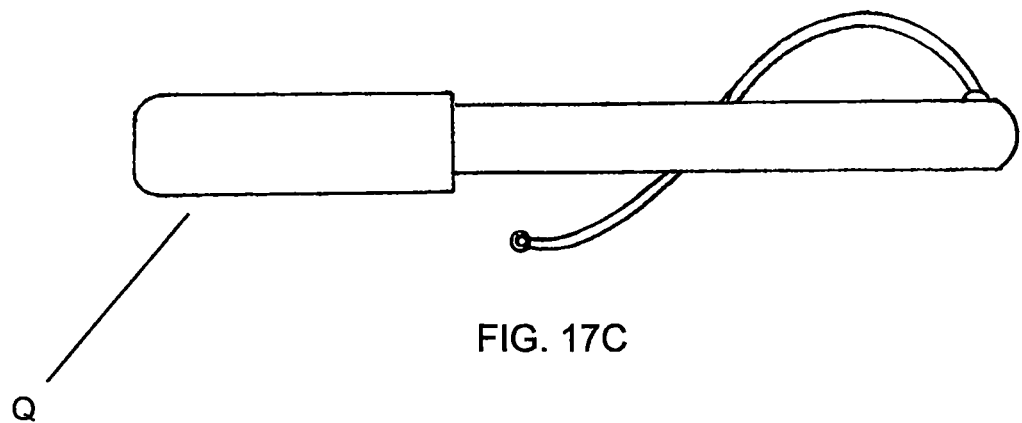
FIG. 17C shows a plan view of view of the air pump Q.
Figure 17A:
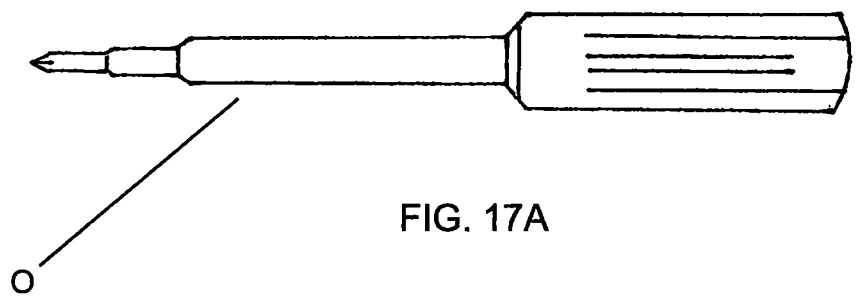
FIG. 17A shows multi-purpose screwdriver O.
Figure 17B:
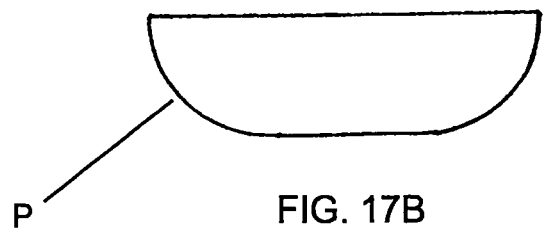
FIG. 17B shows a plan view of the drawer handle P.

FIGS. 16A-16C show how a pickaxe can be formed using 11" screw V and the handle N. An area 22C for storing a piece of rubber RP is also shown.

Any of the differently sized trapezoid elements I, H and J may be attached to the top of the head of the 11" screw to be used as a jack. And the small screw K is configured to fix different attachment to the head of the jack screws.

Figure 18I:
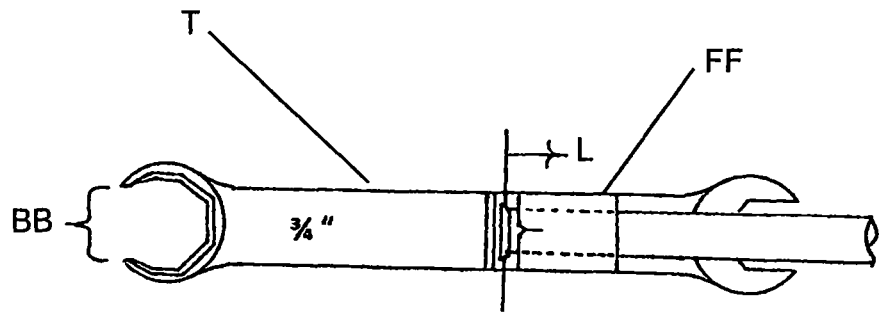
FIG. 18I shows a top view of the wrench T being used with the extension.
Figure 18J:
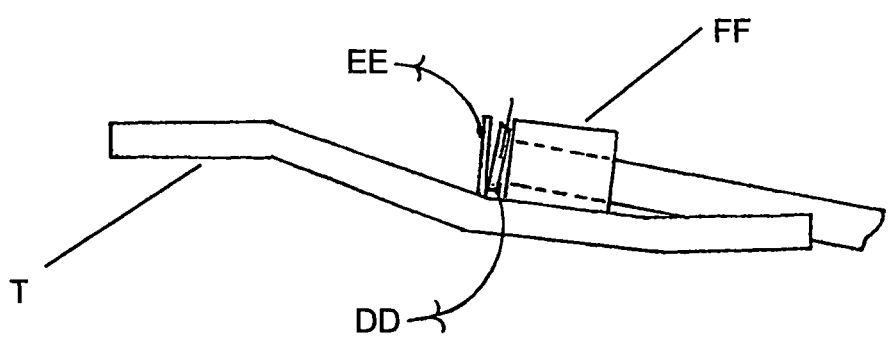
FIG. 18J shows a side view of the wrench T being used with the extension.
Figure 18K:
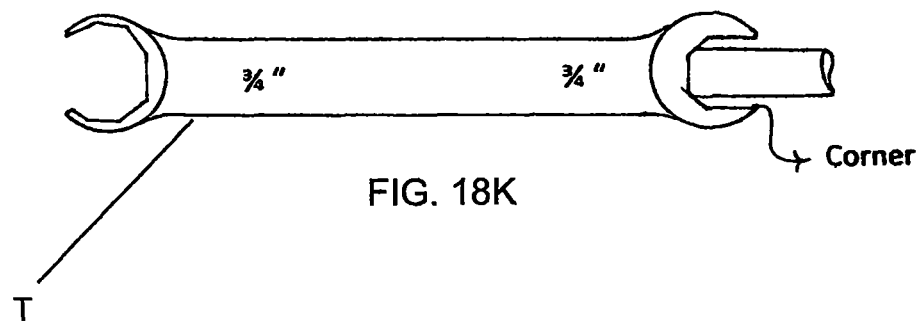
FIG. 18A shows a right side view of the ¾" wrench T.
FIG. 18B shows a top side view of the ¾" wrench T.
FIG. 18C shows a left side view of the ¾" wrench T with boss FF.
FIG. 18D shows a section view of the spike G with the extension inside.
FIG. 18E shows a top view of the ratchet wrench U.
FIG. 18F shows a perspective view of the nut R (two ¾" nuts R are included)
FIG. 18G shows a plan view of the washer S (two washers S are included).
FIG. 18H depicts a side view of wrench T and Boss FF.
Figure 19C:
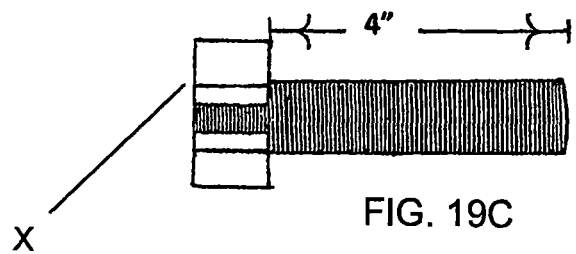
FIG. 19C shows a 4" bolt X for use as a jack in smaller spaces.
Figure 19B:
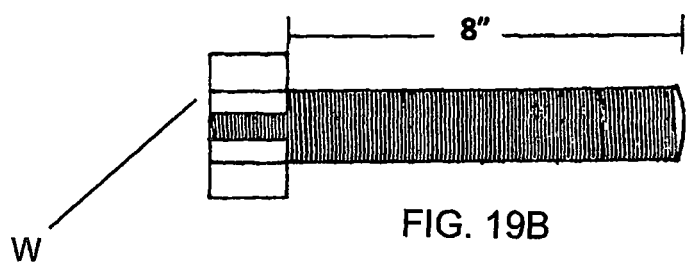
FIG. 19B shows an 8" bolt W to be used as a jack with the chock in the appropriate space.
Figure 19A:
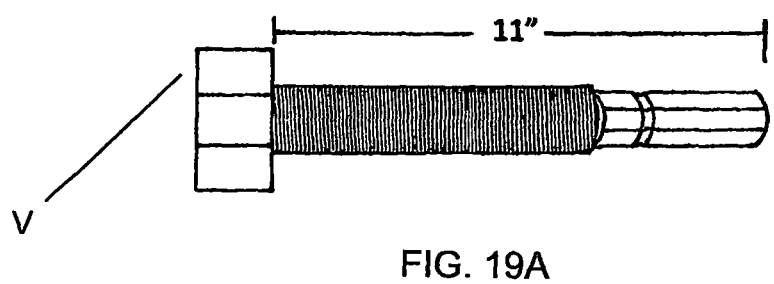
FIG. 19A shows an 11" bolt V used for a quick handle of the tool.

FIGS. 18I-18K depicts the operation of the wrench T joined to the spike G with the extension. Notably, FIG. 18I shows at BB that the width of the wrench mouth is greater than the width of the ½" screw used to lift the cart. When the clip L is positioned in the notch L3 of the spike G, more stability is given to the extension. The spike extension head DD is inserted into the boss all the way and secured with the clip L in notch L3 ensuring that the wrench will stay pi place and continue to do its job. The wrench opening under the extension will facilitate performance by providing torque support when raising or lower the cart. EE is a wall to stop further movement of the head DD of the spike extension.

FIG. 18D shows a section view of the spike G with the extension inside. It is shown here because of the close relationship with the performance of the wrench T when raising or lowering the cart. The extension of the spike G should enter into boss FF as a handle for the wrench T when trying to lift the cart. The head DD of the spike extension will go through the boss FF above the wrench. The cart can be raised without having to lie under the cart.

Figure 22:
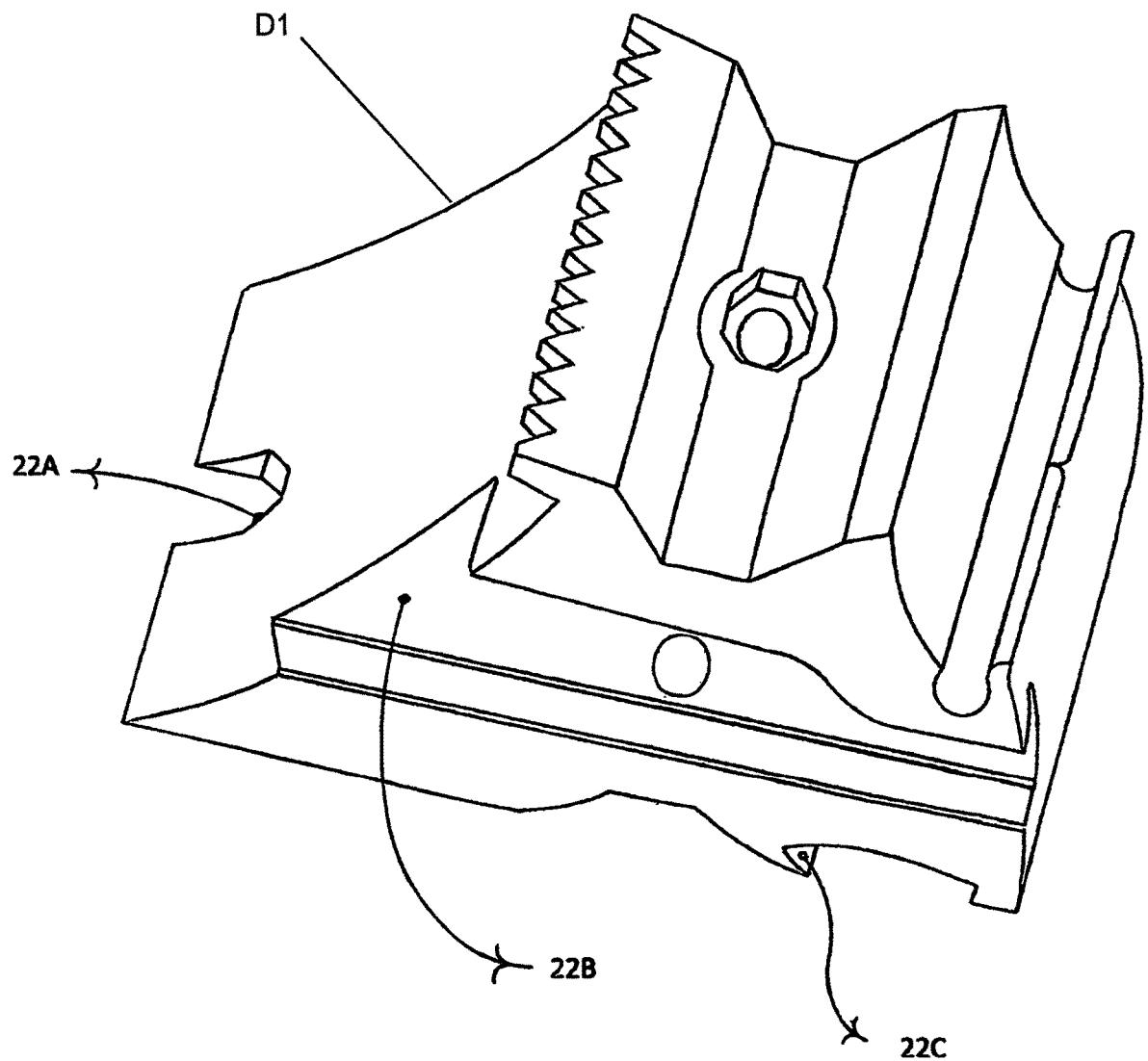
FIG. 22 shows a perspective view of the left chock D1 of PROPCA.
Figure 23:
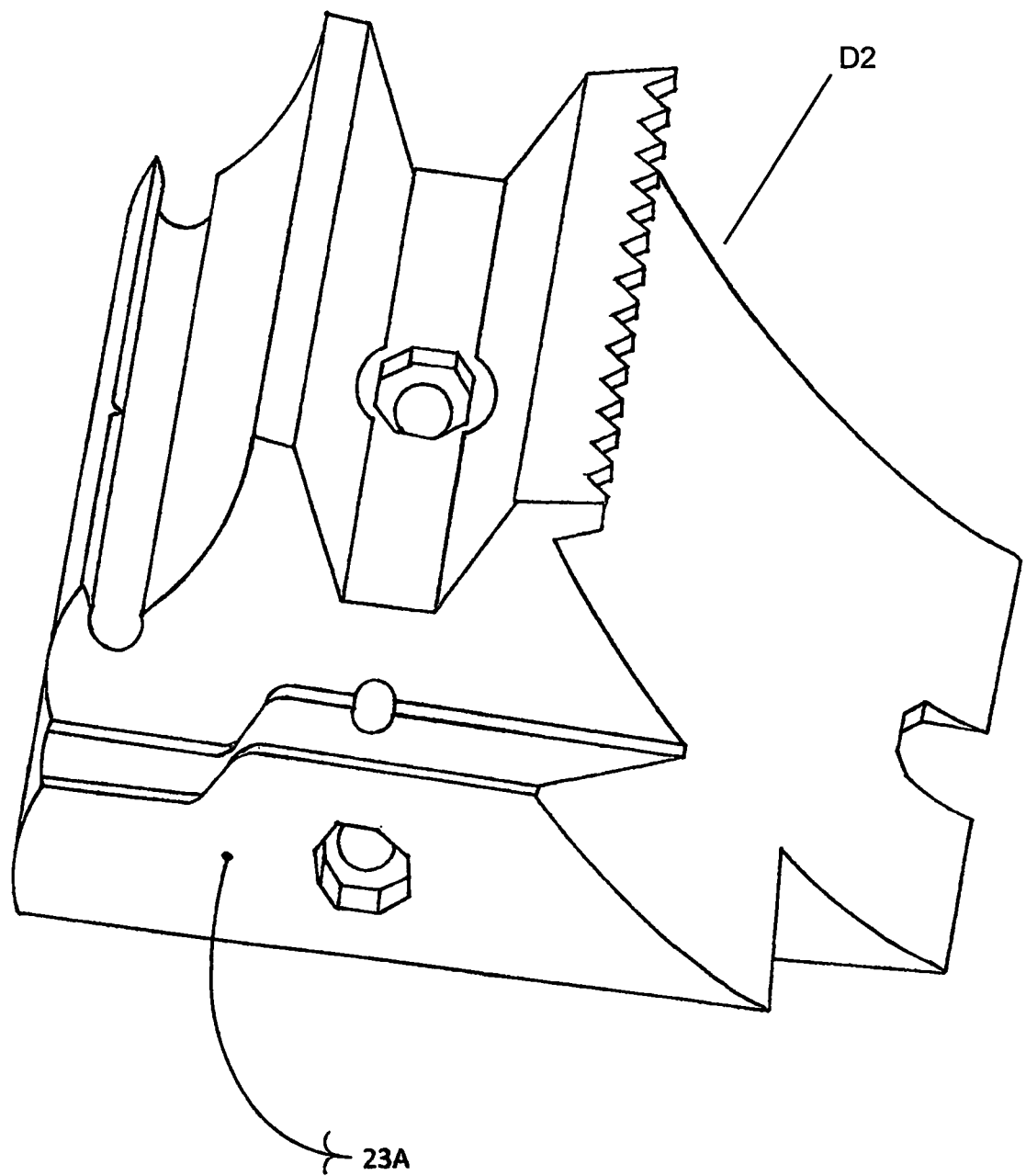
FIG. 23 shows a perspective view of the right chock D2 of PROPCA.

FIG. 22 shows chock D1 which forms the left side of PROPCA in which 22A is a ¾" space for receiving wrench T. 22B is a groove to be attached to the protrusion on the right side of PROPCA (chock D2), and 22C is an area to store piece of rubber RP. FIG. 23 shows chock D2 which forms the right side of PROPCA including protrusion 23A which docks with groove 22B on the left side of PROPCA.

Figure 24:
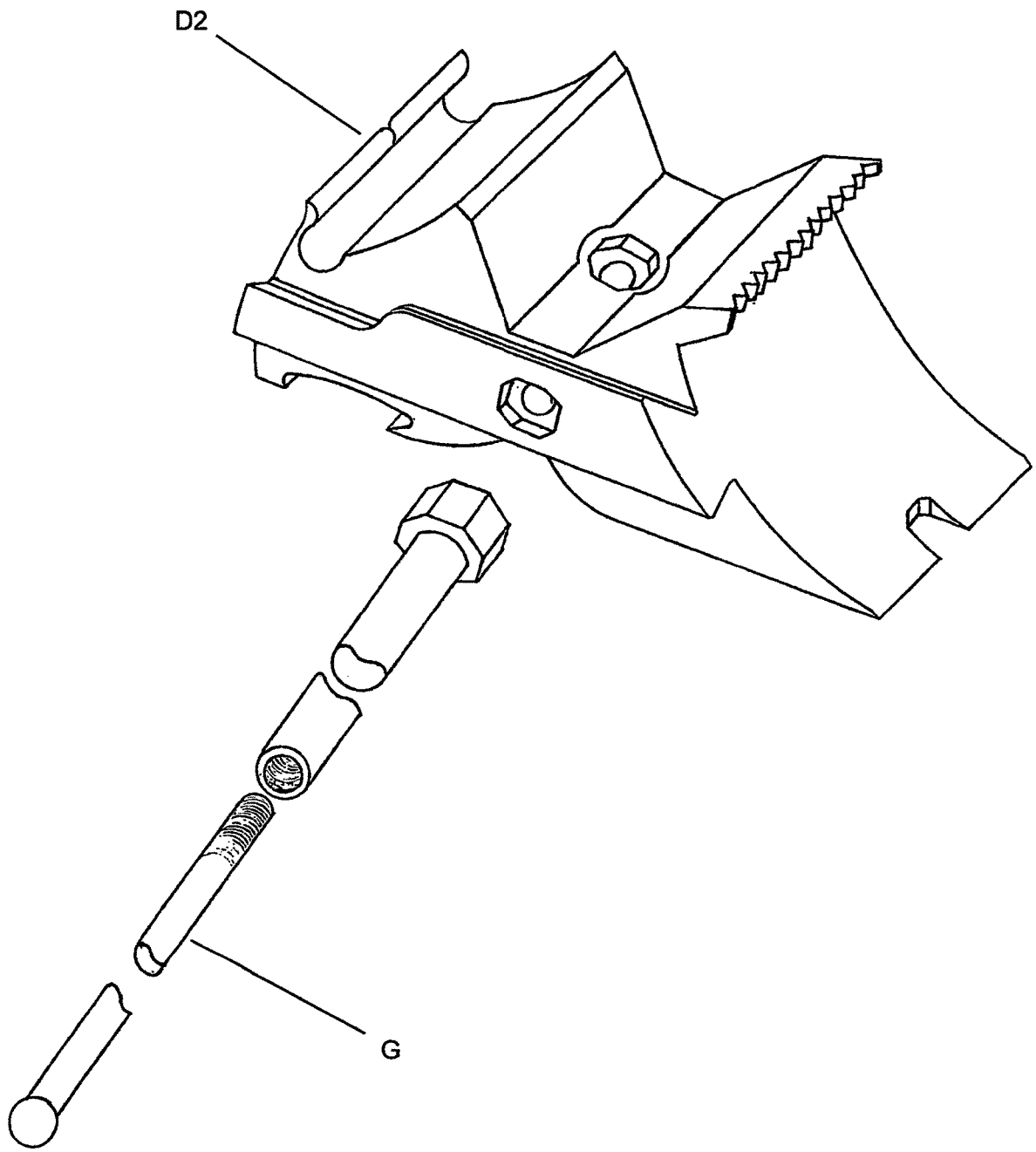
FIG. 24 shows a perspective view of the right chock D2 of PROPCA with the spike screwed into the interior of the extension.
Figure 25:
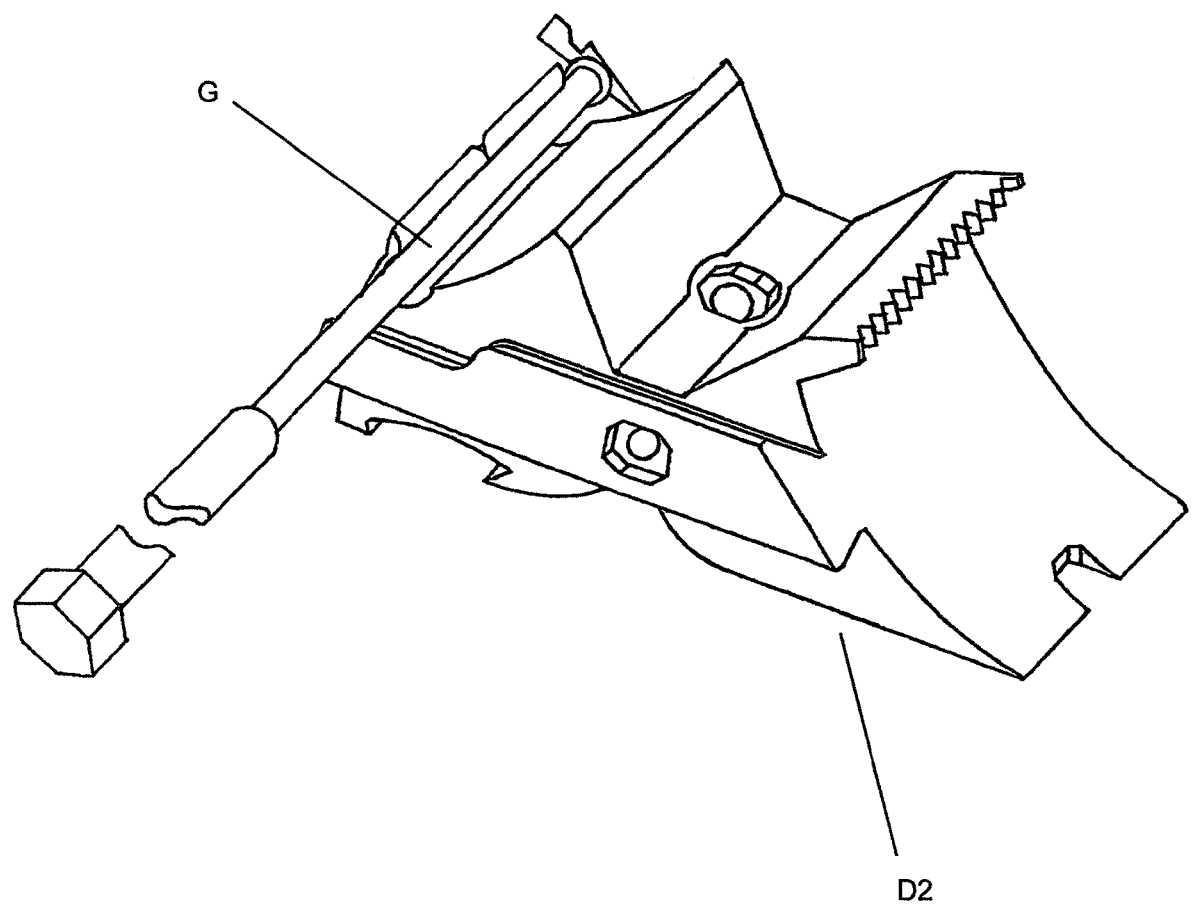
FIG. 25 shows a perspective view of the spike G and the extension screwed together and placed in the nail remover.

FIG. 24 shows how the spike G and plug extension M are docked in the octagonal space of the right side D2 of PROPCA to form a tool. FIG. 25 Shows the spike G with the extension being inserted into the nail remover area of a chock to recover the chock from under the cart. When the clip L is removed, the spike G and extension can be used to lift the chock by placing the extension head DD inside the hole of the boss FF and remove the chock from under the cart by lifting and pulling at the same time.

Figure 26:
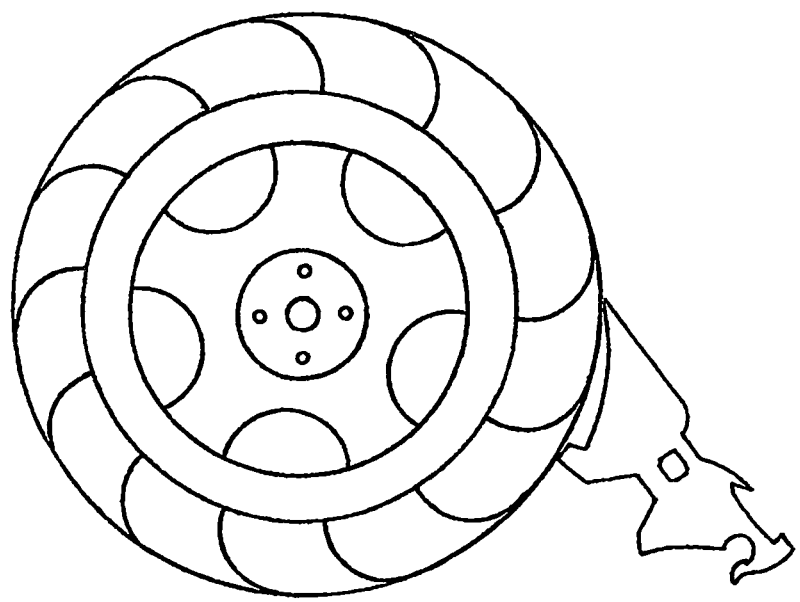
FIG. 26 shows an elevation view of how the inverted chock can lift the vehicle immediately, to get it out of a jam or to remove any object or limb.

As shown in FIG. 26, an inverted chock is placed to liberate a stuck vehicle. The inverted chock can lift the vehicle immediately, to get it out of a jam or to remove any object or limb.

Figure 27:
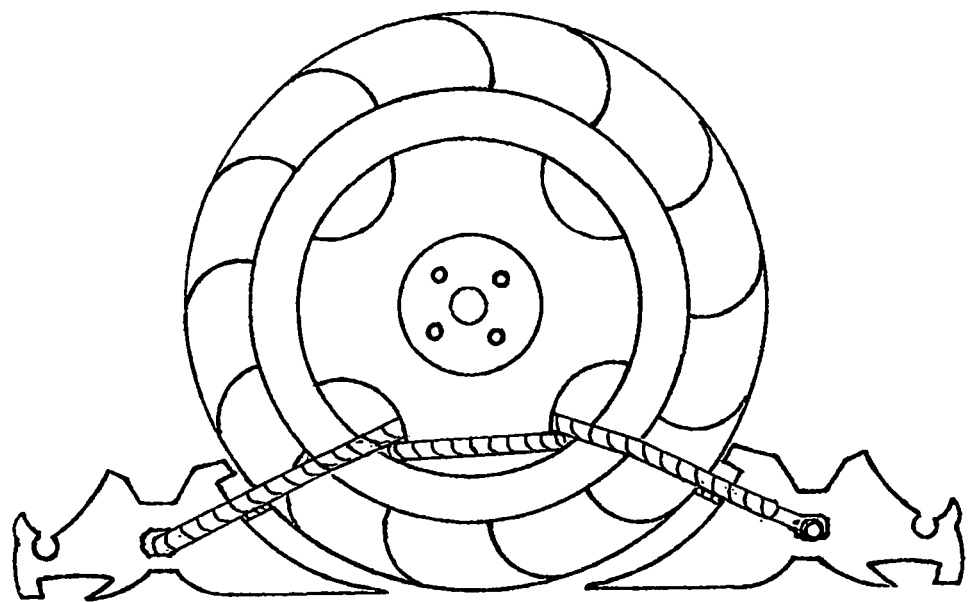
FIG. 27 shows an elevation view of a tire restrained by two chocks attached to the rim by a lockable rope.

As shown in FIG. 27 using a rope and the two chocks attached to a rim of the tire can discourage misappropriation of the golf cart.

Figure 28:
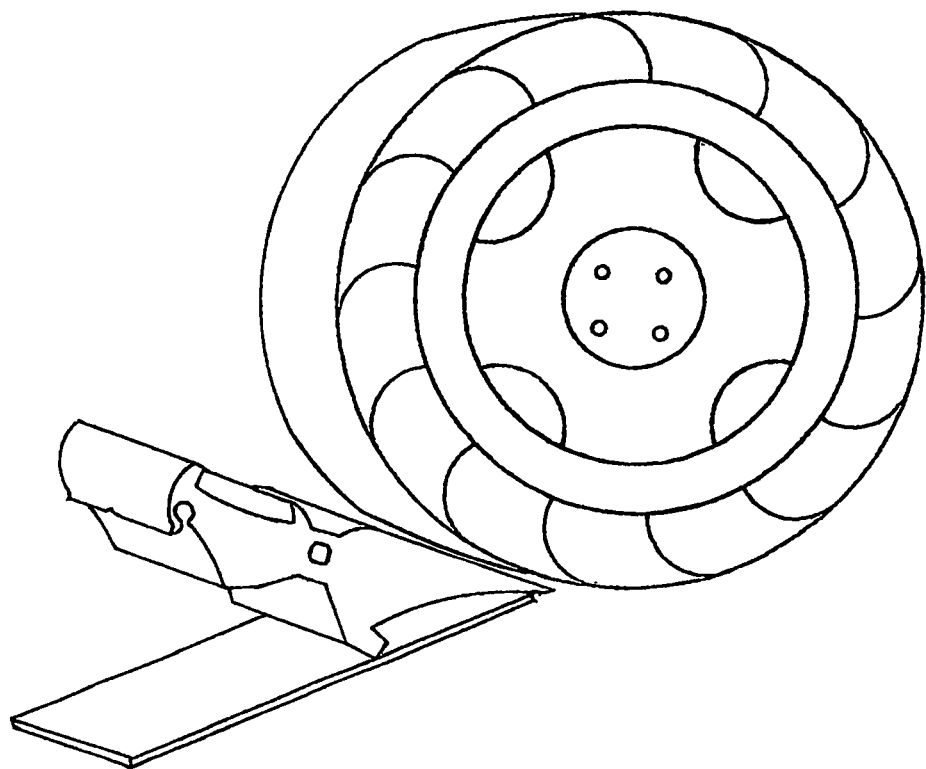
FIG. 28 depicts how an inverted chock on a board can lift the cart while avoiding slipping.

Referring to FIG. 28, an inverted chock placed on a wood board to avoid slipping when immediately lifting the vehicle. The tread area of the tire hits the bottom of the chock, creating a torque that allows the chock teeth to embed into the wood, preventing slippage, helping to lift the cart.

Figure 29:
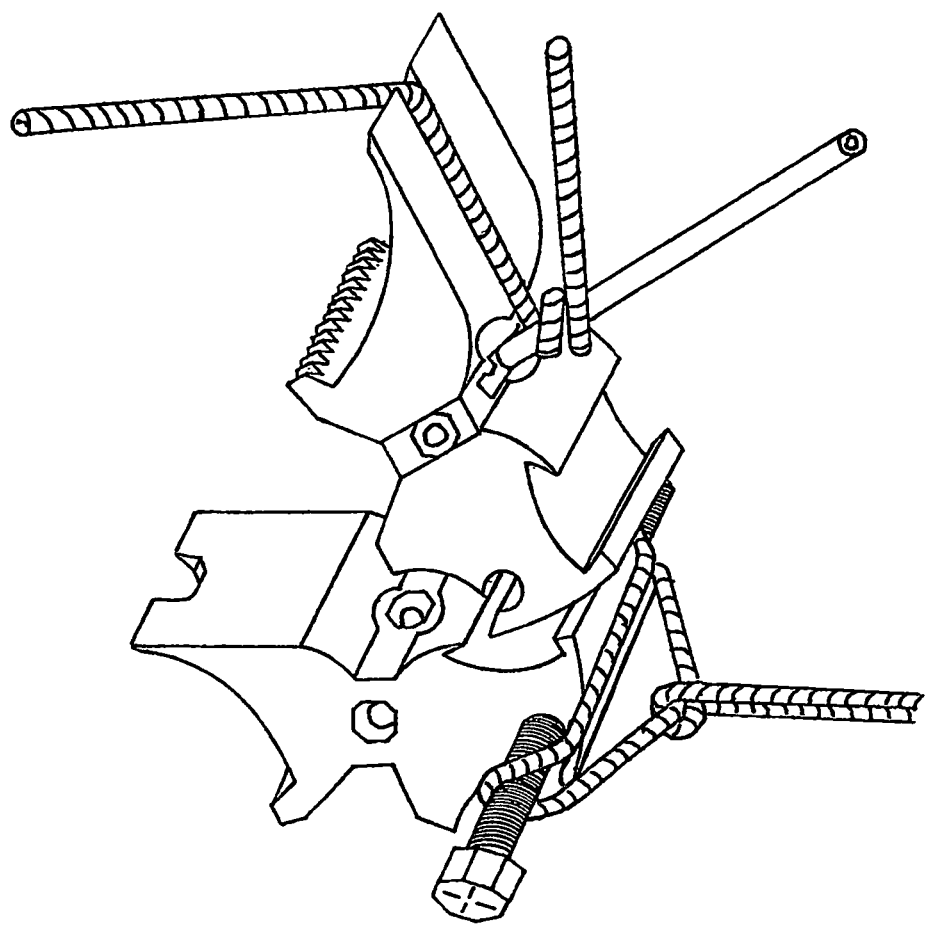
FIG. 29 is a perspective view of two inverted chocks in position to pull a stuck golf cart.

As shown in FIG. 29, two inverted chocks are placed in a position to pull a stuck golf cart. The lower chock is attached to a fixed object. The lower chock can be attached to the fixed object with a rope. The upper chock will be leveraging to pull the cart.

Figure 30:
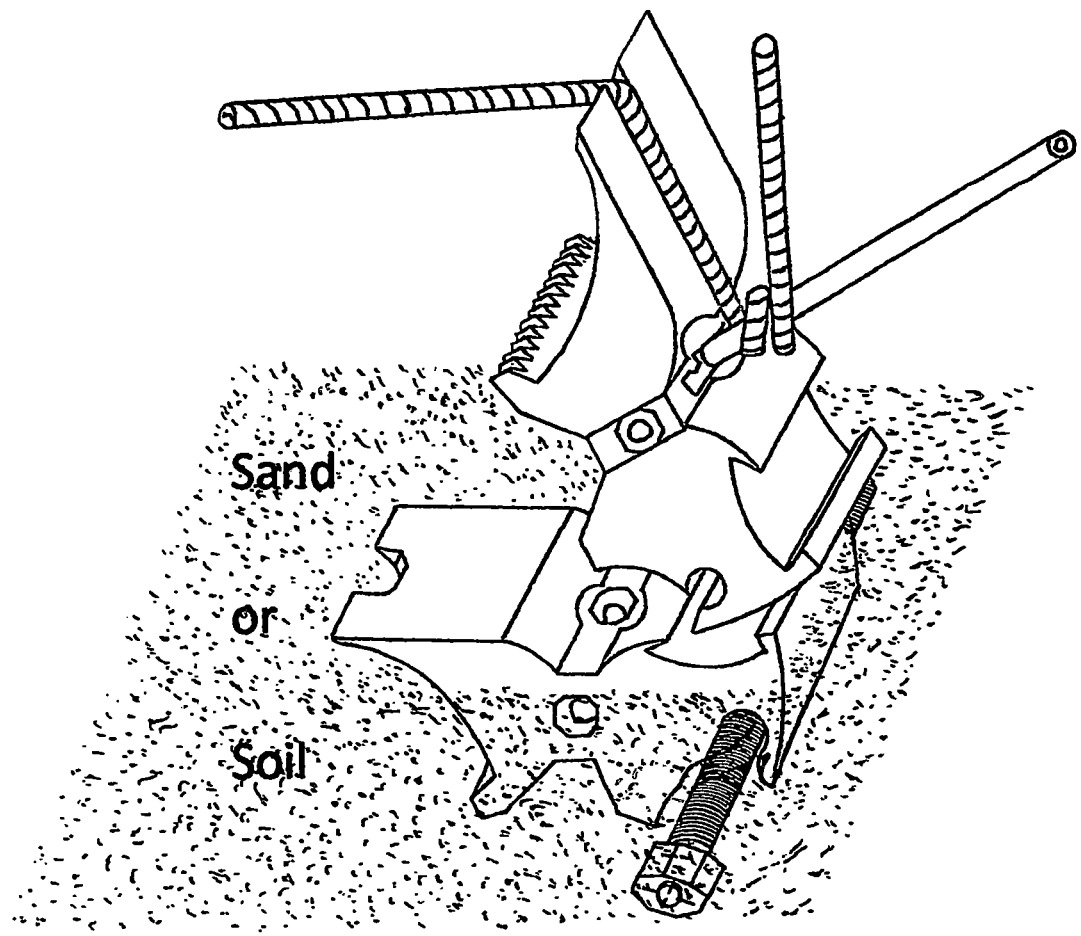
FIG. 30 is a perspective view of two inverted chocks in position to pull a stuck golf cart.

As depicted in FIG. 30, two inverted chocks are working together to unblock a golf cart. If there is no fixed object available to attach the bottom chock, the bottom chock can be been buried to serve as a fulcrum to pull the jammed cart.

Figure 31:
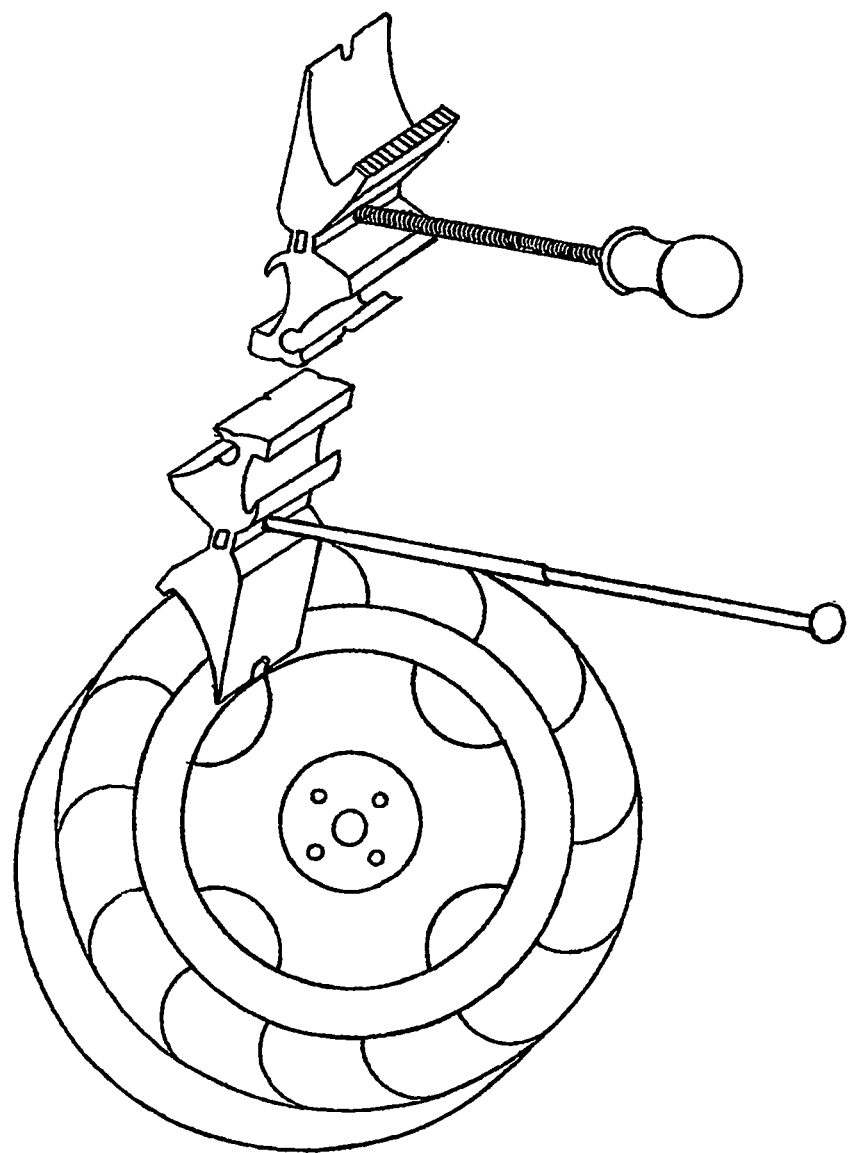
FIG. 31 is a perspective view depicting two chocks, working together, to remove the rim from the tire to be replaced or repaired.

When a tire needs to be replaced or repaired, the two chocks can be used to remove a tire from a rim as shown in FIG. 31.

The tool box attaches to the top of the roof of the golf cart, as a monolithic piece. It has measurements of about 6" height, 22" wide and 12" deep. The shape of a the tool box is designed so that it can enclose the PROPCA tool in its interior. Also, there will be a plurality of attachments needed in the tool box in order to assemble the different multipurpose tools. The 11" bolt (fine thread) and the 11" long spike included are installed in the PROPCA before placing the PROPCA in the tool box. (CAPROP). The plurality of attachments are each installed, in the CAPROP, in a respective compartment having the shape of a respective attachment.

Figure 5:
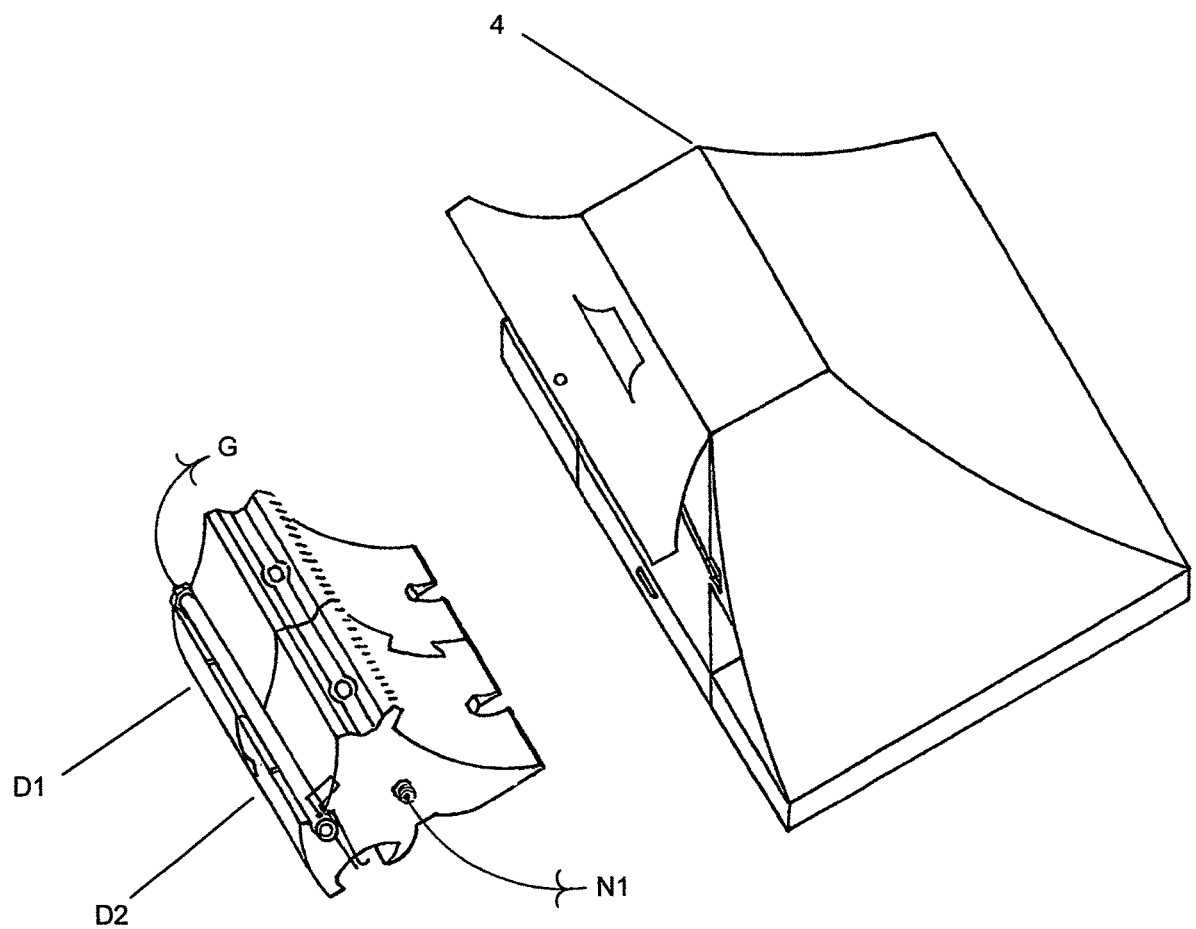
FIG. 5 shows a perspective view of chocks D1 and D2 (PROPCA tool) being inserted into CAPROP 4.

Golf carts are small carts and tools for it should be designed in accordance with the size. Furthermore, the tools should be located in the golf cart at all times, so we don't have to look for tools in the cart trunk or so we don't have to call a flatbed truck in order to service the cart. Such actions waste a lot of time and money in addition to the already difficult task of replacing or fixing a flat tire. There is an emergency red light on the top flap or cover of the tool box, and inside the flap there will be a LED light with an on/off switch B1 to see inside the tool box at night. The emergency red light will be at a higher altitude on top of the tool box cover or flap (FIG. 5).

If the golf cart tips over, that bulge of the tool box at the top of the roof will provide added resistance preventing the cart from continuing to rotate.

It is understood that while certain forms of the present invention have been illustrated and described herein, it is not be limited to the specific forms or arrangements of parts described and shown.

What is claimed is:

1. A tool box configured to be attached to a center, rear portion of a golf cart roof, said tool box comprising:
   a first chock comprises a protuberance, and a second chock comprises a groove, wherein the first chock is configured to be coupled to the second chock by sliding the protuberance of the first chock into the groove of the second chock;
   a spike that has a length at least as long as the width of the first and second chocks when the first and second chocks are coupled together;
   a main housing comprising a left-side tool compartment, a right-side tool compartment and a chock storage area located between the left tool compartment and the right tool compartment, where the chock storage area is configured to store the first chock and the second in a state in which the first chock and second chock have been coupled together;
   a lid pivotally connected to the main housing with two hinges, wherein the lid is movable between an open position and a closed position; and
   a locking mechanism configured to lock the lid to the main housing;
   a first plurality of tools; and
   a second plurality of tools,
   wherein the first chock and the second chock each have a through-hole configured to receive an eleven inch long bolt;
   wherein the left-side tool compartment is configured to store the first plurality of tools, and the right-side tool compartment is configured to store the second plurality of tools,
   wherein the main housing has a shape including a flat base, a flat back side, formed by the lid and perpendicular to the flat base, a convexly curved front side, a convexly curved left side, a convexly curved right side, and a flat top perpendicular to the flat back side, and
   wherein, when the tool box is attached to the roof of a golf cart, the shape of the main housing is configured to prevent continued rolling-over of the golf cart in the event that the golf cart tips over onto a side of the golf cart.

2. The tool box according to claim 1, wherein the shape of the main housing substantially conforms to the shape of the first and the second chock when they are coupled together.

3. The tool box according to claim 2, further comprising: an LED light internal to the main housing and an on/off switch for controlling the internal LED light.

4. The tool box according to claim 3, wherein:
   the left-side tool compartment includes a first plurality of spaces, each space of the first plurality of spaces being shaped to conform to a shape of each of the first plurality of tools, respectively; and
   the right-side tool compartment includes a second plurality of spaces, each space of the second plurality of spaces being shaped to conform to a shape of each of the second plurality of tools, respectively.

5. The tool box according to claim 1, wherein the main housing has a height of 6", a width of 22", and a depth of 12".

6. The tool box according to claim 1, further comprising: a long screw;

a first horizontal hole positioned in the first chock;

a second horizontal hole positioned in the second chock, wherein when the first chock and the second chock are coupled together, the first chock with the protuberance and the second chock with the groove form a long continuous bore configured to store the long screw when the first chock and the second chock are stored in the tool box.

7. The tool box according to claim 1 wherein the first plurality of tools includes a clip and the second plurality of tools includes a wrench with a boss.

8. The tool box according to claim 7, wherein the wrench, the spike, and the clip are configured to be coupled together to form another tool configured to be used with a jack.

9. The tool box according to claim 8, further comprising:

a small hole located at an end of the spike and configured to receive the clip;

a stopper wall on the wrench and spaced apart from an end of the boss, wherein the spike is retained on the wrench by passing the clip through the aperture when the end of the spike is positioned between the boss and the stopper wall.

\* \* \* \* \*